United States Patent [19]

Girard

[11] Patent Number: 5,595,474
[45] Date of Patent: Jan. 21, 1997

[54] PITCH VARIATION CONTROL DEVICE FOR THE BLADES OF A TURBOMACHINE ROTOR AND METHOD OF OPERATING THE DEVICE

[75] Inventor: Francis Girard, Viroflay, France

[73] Assignee: Hispano-Suiza, Saint Cloud, France

[21] Appl. No.: 627,394

[22] Filed: Apr. 4, 1996

Related U.S. Application Data

[63] Continuation of Ser. No. 338,798, Nov. 10, 1994, abandoned.

[30] Foreign Application Priority Data

Nov. 10, 1993 [FR] France .................................. 93 13409

[51] Int. Cl.$^6$ .................................................. B64C 11/44
[52] U.S. Cl. ........................ 416/1; 416/153; 416/162
[58] Field of Search .............................. 416/1, 46, 47, 416/48, 152, 153, 155, 162

[56] References Cited

U.S. PATENT DOCUMENTS

| | | | |
|---|---|---|---|
| 2,370,135 | 2/1945 | Berliner | 416/162 |
| 2,612,228 | 9/1952 | Forsyth | 416/155 |
| 2,632,516 | 3/1953 | Longfellow | 416/46 |
| 3,044,558 | 7/1962 | Tiedeman | 416/46 |
| 3,900,274 | 8/1975 | Johnston et al. | 416/155 |
| 4,591,313 | 5/1986 | Miyatake et al. | 416/155 |
| 5,183,387 | 2/1993 | Huggett et al. . | |
| 5,205,712 | 4/1993 | Hamilton | 416/162 |
| 5,281,094 | 1/1994 | McCarty et al. | 416/162 |
| 5,282,719 | 2/1994 | McCarty et al. | 416/162 |
| 5,451,141 | 9/1995 | Carvalho et al. | 416/152 |
| 5,451,856 | 9/1995 | Girard et al. . | |

FOREIGN PATENT DOCUMENTS

890641 2/1944 France .

*Primary Examiner*—James Larson
*Attorney, Agent, or Firm*—Oblon, Spivak, McClelland, Maier & Neustadt, P.C.

[57] ABSTRACT

A device for controlling the pitch of the blades of a turbomachine rotor includes an electric motor having a stator which is stationary and a rotor, preferably of the permanent magnet or asynchronous kind, which is mounted on the turbomachine shaft and is rigidly secured to a toothed wheel meshing with pinion sectors rigidly secured to the roots of the blades, and a mechanism for locking the blade roots in position which includes an electromechanical actuator rigidly secured to the shaft and electrically powered by a rotary transformer.

28 Claims, 7 Drawing Sheets

PITCH VARIATION CONTROL DEVICE FOR THE BLADES OF A TURBOMACHINE ROTOR AND METHOD OF OPERATING THE DEVICE

BACKGROUND OF THE INVENTION

This application is a continuation of application Ser. No. 08/338,798, filed Nov. 10, 1994, now abandoned.

FIELD OF THE INVENTION

The invention relates to a device for controlling the orientation of the blades of a turbomachine rotor and to a method of operating the device. The invention is of particular use in gas turbine engines or turbojet engines provided with a fan having a plurality of blades adapted to pivot around their longitudinal axis to adjust their pitch.

DISCUSSION OF THE BACKGROUND

It is particularly useful to be able to adapt the pitch of the blades of the fan of an engine to different flight conditions so as to obtain optimum engine performance and thrust reversal. The energy output of the engine can be optimized by varying the blade pitch to suit specific operating conditions.

Devices for controlling the variation of blade pitch usually comprise hydraulic actuators which drive gears to move the blades into the required position. These devices are complex, bulky and unreliable.

Alternatively, there are electric drive systems for controlling the pitch of rotor blades. These systems usually use direct current (dc) motors activated and deactivated by relays powered from the aircraft dc bus, and comprise means for transmitting electric power using electrical contacts between a commutator and brushes. These contacts are subject to wear, causing reliability problems.

Accordingly, it is an object of the invention to obviate the disadvantages of the known devices and to provide a control device for varying the pitch of rotor blades which is simple, reliable, light and compact.

SUMMARY OF THE INVENTION

To this end, according to the invention there is provided a pitch variation control device for the blades of a turbomachine rotor, the blades being mounted on a disc rotated by a shaft of the turbomachine and each blade having a root pivotable around a longitudinal axis of the blade, said control device comprising actuating means for changing the pitch of the blades and locking means for locking the roots of the blades; the actuating means comprising an electric motor having a stationary stator winding and a rotor which is secured to the turbomachine shaft and has no electrical connection to the stator, and a toothed wheel which is rigidly secured to the rotor of the electric motor and meshes with pinion sectors rigidly secured to the roots of the blades; and the locking means comprising an electromechanical actuator which is rigidly secured to the turbomachine shaft and is electrically powered by way of a rotary transformer.

Preferably the assembly formed by the pinion sectors, the toothed wheel and the rotor of the electric motor has a maximum angular movement defined by fixed stops corresponding to two extreme blade positions, and there may be at least one movable stop corresponding to at least one intermediate blade position between the two extreme positions.

The electromechanical actuator is preferably associated with a bolt for retaining the blade roots in a predetermined position.

The invention also provides a method of operating a blade pitch variation control device in accordance with the invention to change over from a locked position against a first stop to a locked position against a second stop, comprising the steps of:

measuring the speed of rotation of the turbomachine shaft and monitoring the position of the bolt;

powering the electric motor;

producing a rotating magnetic field between the stator and the rotor of the electric motor such that the magnetic field rotates at a different speed from the turbomachine shaft to produce a magnetic torque able to clamp the blades in position against the first stop to facilitate unlocking of the blade roots and to retain the blades in this position during the unlocking operation;

supplying power to the bolt actuator to release the blade roots;

altering the speed of the rotating magnetic field so that the direction of the magnetic torque is reversed and the blades are rotated around their longitudinal axes from the first stop as far as the second stop;

cutting off the power supply to the locking system to lock the blade roots against the second stop, and cutting off the power supply to the electric motor.

Other features and advantages of the invention will become apparent from the following description of various embodiments, given by way of non-limitative example, with reference to the accompanying drawings.

DESCRIPTION OF THE PREFERRED EMBODIMENTS

Figure 1:
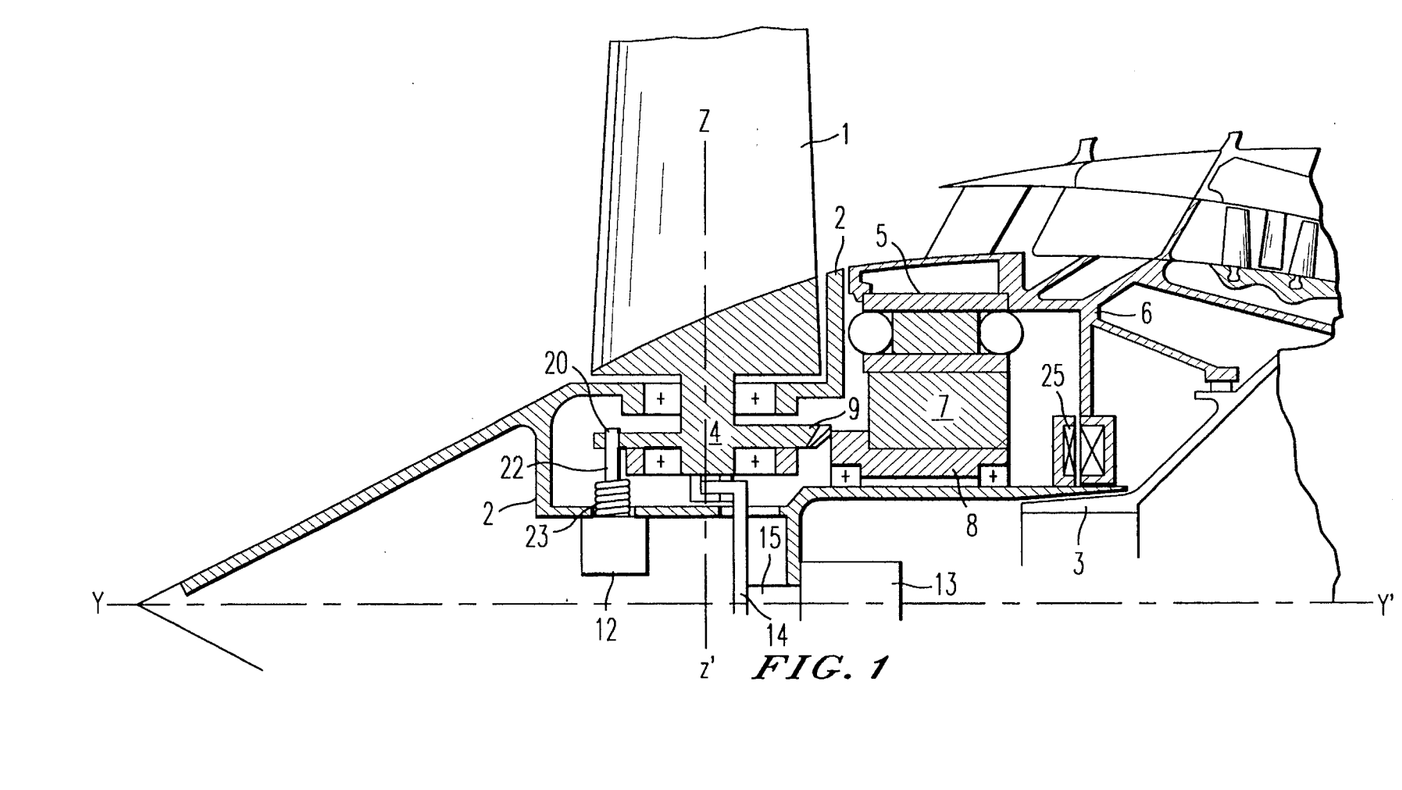
FIG. 1 is a partial axial section through the front of a turbojet engine comprising one embodiment of a control device in accordance with the invention for varying the pitch of the blades of a fan of the engine.

FIG. 1 is a partial axial section through the front of a turbojet engine comprising a control device in accordance with the invention for varying the pitch of the blades of a fan. The engine has a fan with a plurality of blades 1 mounted on a disc which is rotated by the engine main shaft 2. The shaft 2 is driven by a gas generator (not shown) by way of a speed reducer 3. Each fan blade has a root 4 pivotable around its longitudinal axis Z—Z' to vary the blade pitch.

The control device for varying the rotor blade pitch has actuating means to change the blade pitch and means for locking the blade root in a predetermined position.

Figure 2A:
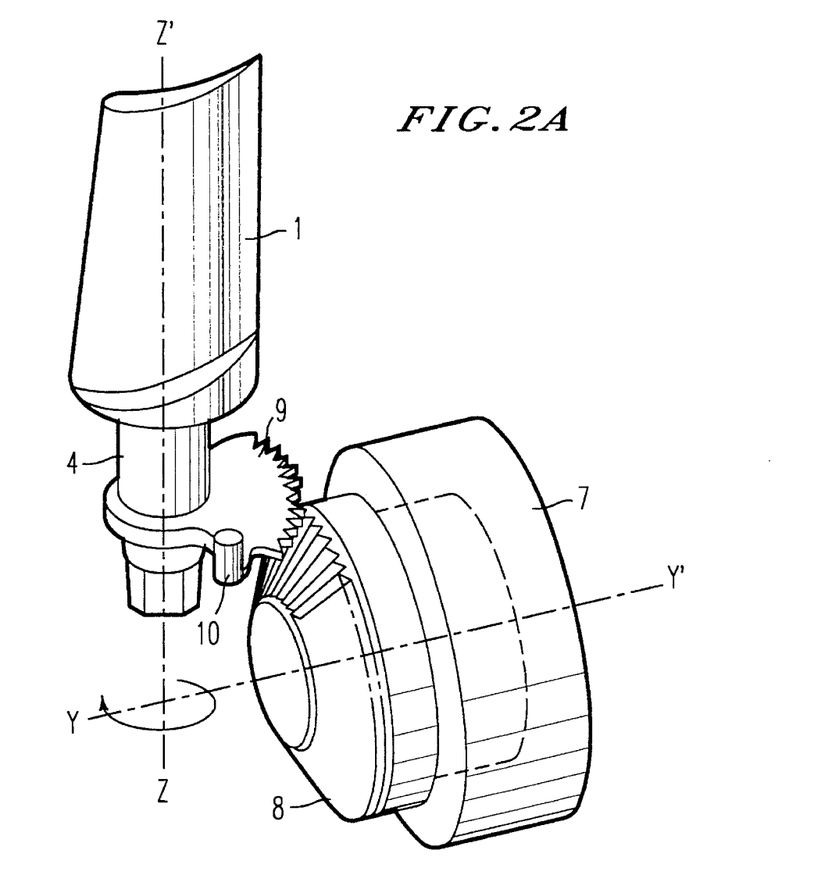
FIG. 2a is a perspective view of part of the actuating means of the control device in FIG. 1.
Figure 2B:
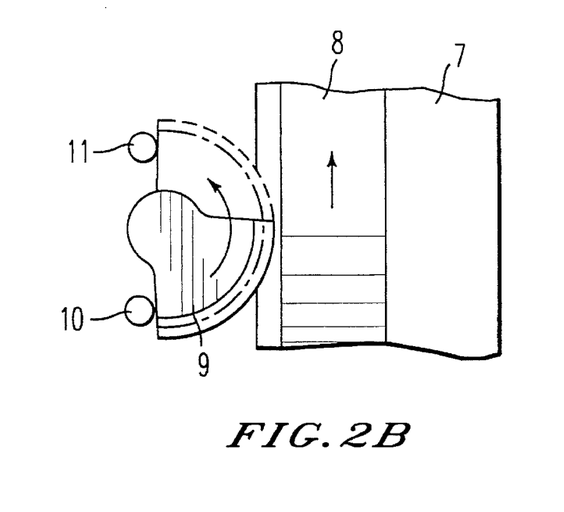
FIG. 2b is a sectional view of a part of the actuating means.
Figure 2C:
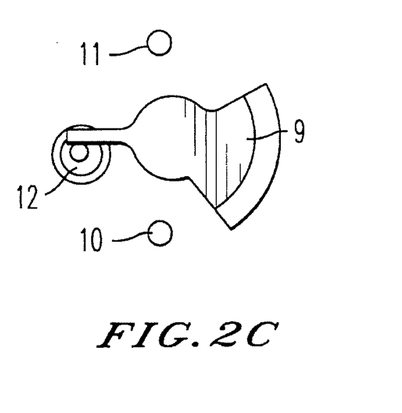
FIG. 2c is a sectional view of another part of the actuating means.

FIGS. 1, 2a, 2b and 2c diagrammatically illustrate the actuating means for changing the blade pitch. This means comprises an electric motor having a stator winding 5 rigidly secured to the fixed structure 6 of the engine, and a rotor 7 rigidly secured to a toothed wheel 8 mounted on roller bearings and extending around the main shaft 2. The wheel 8 meshes with pinion sectors 9 which are secured to the root 4 of each blade 1, and enables the blades to be rotated around their longitudinal axis Z—Z'. The maximum angle of rotation of the assembly formed by a pinion 9, the toothed wheel 8 and the rotor 7 of the electric motor is defined by two fixed stops 10, 11 as shown diagrammatically in FIG. 2b. These two fixed stops correspond to operation of the engine in forward thrust and reverse thrust respectively. If one or more intermediate blade positions are required then movable stops 20, for example electromagnets, can be provided to supplement the fixed stops as shown in FIG. 2c.

To obtain a number of different angular positions supplementary stops can be mounted on the angular path of a pinion sector 9 associated with a blade root 4 between the two fixed stops 10, 11. It is particularly advantageous to have three different angular positions available to give a blade a first position for take-off, a second position for cruising flight and a third position for thrust reversal.

Each movable stop 20 can be formed by means of an electromagnet 12. The electromagnet is housed in a casing rigidly secured to the engine shaft 2, and comprises a winding in which a movable metal rod 22 can be displaced longitudinally by a magnetic field. To increase the reliability and safety of the blade pitch variation control device a return spring 23 is disposed around the rod 22 so to retain it in its extended or end-of-travel position when the electromagnet 12 is in a de-activated state. The position of the movable stop 20 is monitored automatically and permanently by way of a position detector 24, for example of the end of stroke contact type.

Figure 3:
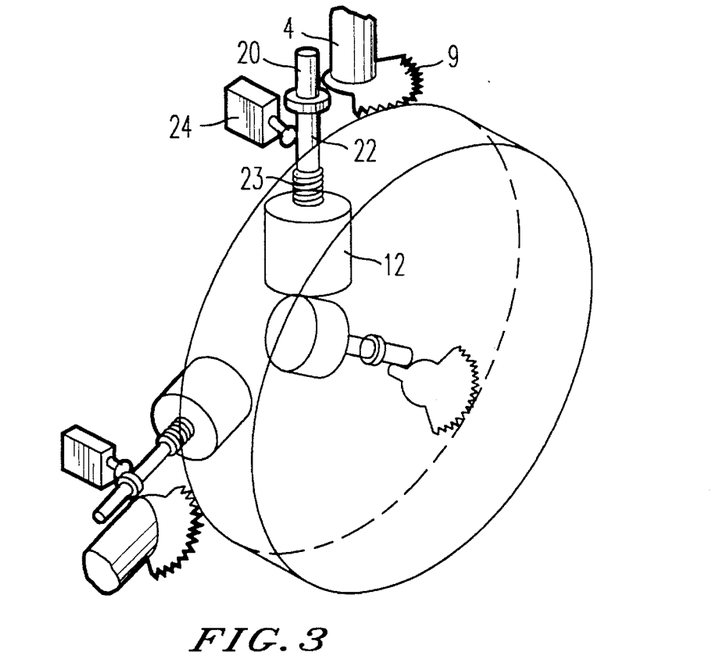
FIG. 3 is a diagrammatic view of one arrangement of the movable stops in the control device in FIG. 1.

Since the blade roots 4 are held mechanically by the toothed wheel 8 by way of the pinion sectors 9, an intermediate blade position can be achieved just by placing a movable stop on a single blade, and all the blades will take up this intermediate position. Advantageously, however, to increase the reliability of the blade pitch variation control device a movable stop for a predetermined intermediate position is preferably provided on a number of different blades. For example, and as FIG. 3 shows, three evenly spaced-apart blades may each have a movable stop for a predetermined intermediate position.

Similarly, a number of intermediate positions can be provided if a number of movable stops are placed at different angular positions relative to the pinion sectors 9. The movable stops situated at different angular positions relative to the pinion sectors need not necessarily be placed on the same blade root.

The electromagnets 12 actuating the movable stops 20 can be powered without actual electrical contact by way of a rotary transformer.

The electric motor used may be of the permanent magnet or asynchronous kind so as to eliminate friction and wear problems between the rotating part and the static part. The stator winding is stationary and is energized by alternating current (ac) using means which is known but not shown, for example an alternator or a generator associated with a rectifier and a thyratron inverter, so as to produce an alternating current at a controlled frequency. A permanent magnet rotor, if provided, can, if required, comprise a closed circuit winding so as to increase motor power and reduce motor dimensions, the latter winding not being connected to the stator winding.

Figures 4A, 4B:
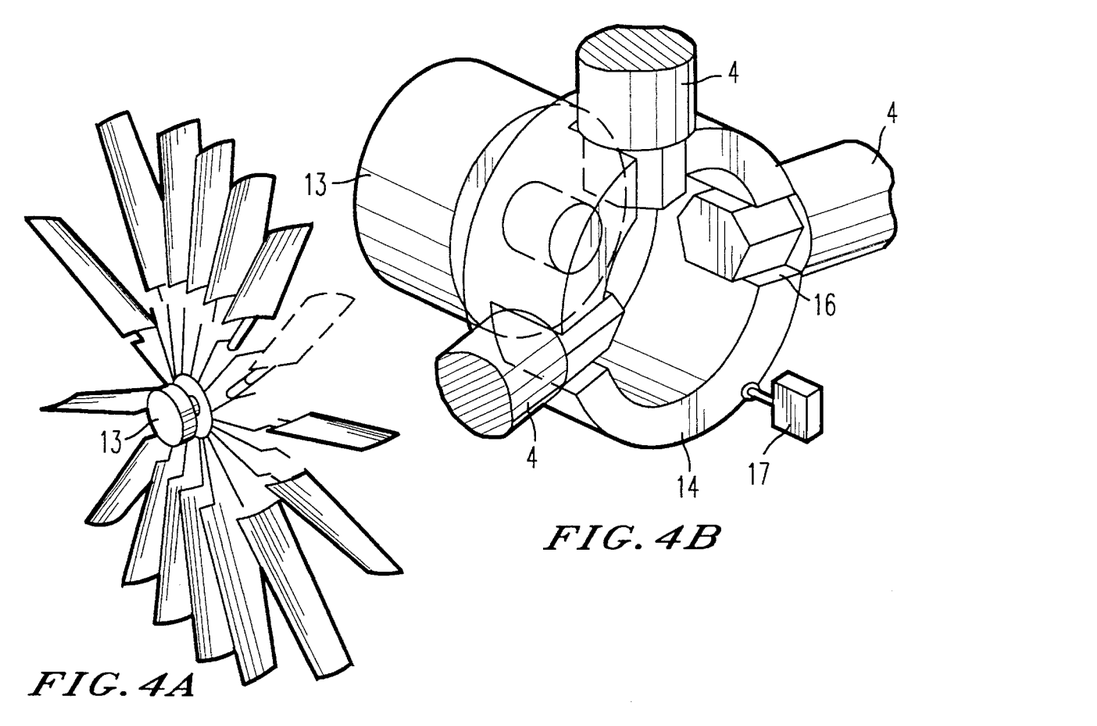
FIG. 4a is a diagrammatic view showing the arrangement of the blade locking means relatively to the bladed disc in the control device of FIG. 1.
FIG. 4b is a more detailed diagrammatic view of the blade root locking means of the control device.

The blade-locking means are shown diagrammatically in FIGS. 4a and 4b, and comprise an electromechanical actuator 13, for example an electromagnet, associated with a bolt 14 for retaining the blade roots 4 in a predetermined position. The blade roots are machined to have a number of surfaces corresponding to various possible predetermined positions. The actuator 13 comprises, in a casing rigidly secured to the engine shaft 2, a winding in which a metal rod 15 is movable longitudinally. The bolt 14 is rigidly secured to the rod 15, and when the rod 15 moves, it moves the bolt 14 with it. To retain the blade roots in a predetermined position the bolt 14 is formed with recesses 16 matching the blade roots. In the locked position the blade roots are locked in the recesses 16 in the bolt 14. For increased safety of the locking system the position of the bolt 14 is monitored automatically and permanently by way of a position detector 17, for example an end of stroke type of detector.

Since all the blades have a pinion sector and the pinion sectors all mesh with the same toothed wheel, all the blades are mechanically interconnected. It is therefore unnecessary for the bolt to have recesses for retaining all the blade roots, and the retention of a single blade will be sufficient to lock all the other blades in the same position. However, for reliability and stability reasons it is preferable for the bolt to retain two diametrically opposite blades, or three evenly spaced-apart blades as shown in FIG. 4b.

In the same way as the electromagnets 12 operate the movable stops 20, the actuator 13 is powered without touching an electrical contact by way of a rotary transformer.

Figure 5:
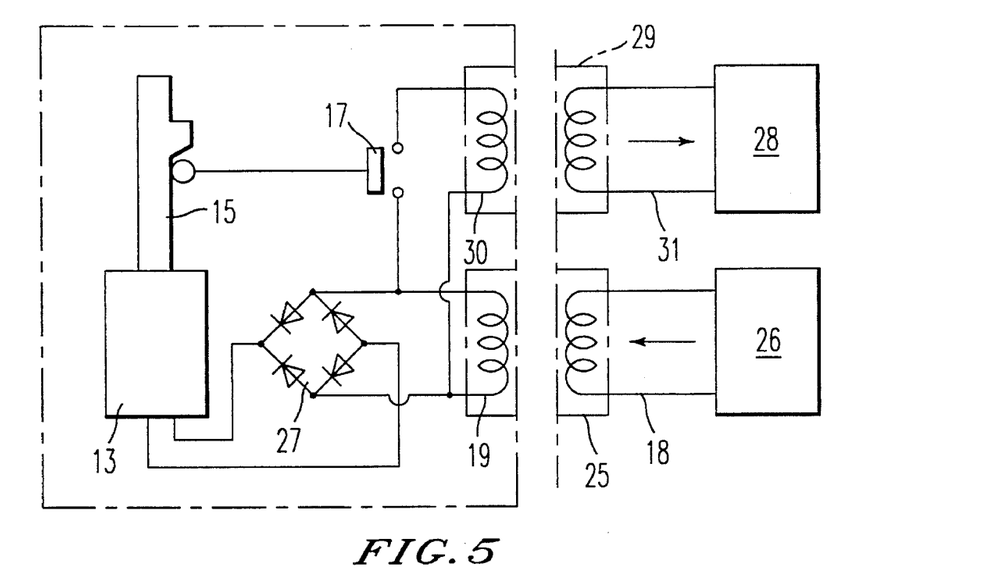
FIG. 5 shows a first embodiment of an electrical operating and monitoring arrangement for the electromechanical actuator of the control device of the invention.

FIG. 5 shows one embodiment of an electrical control and monitoring system for an electromechanical actuator for a control device in accordance with the invention.

The actuator 13 is operated by way of a first rotary transformer 25 comprising a primary winding 18 rigidly secured to the fixed structure of the turbojet engine and a secondary winding 19 secured to the engine shaft 2. At the input of the transformer 25 the primary winding 18 is connected to a power supply device 26. At the output of the transformer 25 the secondary winding 19 transmits the electrical power necessary to operate the actuator 13 by way of a rectifying diode bridge 27. The power for operating the actuator must be high enough to overcome its inertia and move the rod 15.

The position of the rod 15 is signalled by a position detector 17, for example of the end of stroke kind, in the form of an electric switch, the position signal being transmitted to a position monitor 28 by way of a second rotary transformer 29. The second rotary transformer 29 comprises a primary winding 30 which is secured to the engine shaft 2 and is connected across the secondary winding 19 of the first transformer 25, and a secondary winding 31 which is connected across the input of the position monitor 28. When the switch of the position detector 17 is in the closed state the second transformer 29 is energized by way of the first transformer 25 and transmits the energy received to the position monitor 28. This first example of an electrical device for operating and monitoring an electromechanical actuator is particularly suitable for an environment subject to heavy temperature stressing since it has very few electronic components. However, the presence of two rotary transformers has the disadvantage of increasing the weight and bulk of the blade-locking device.

Figure 6:
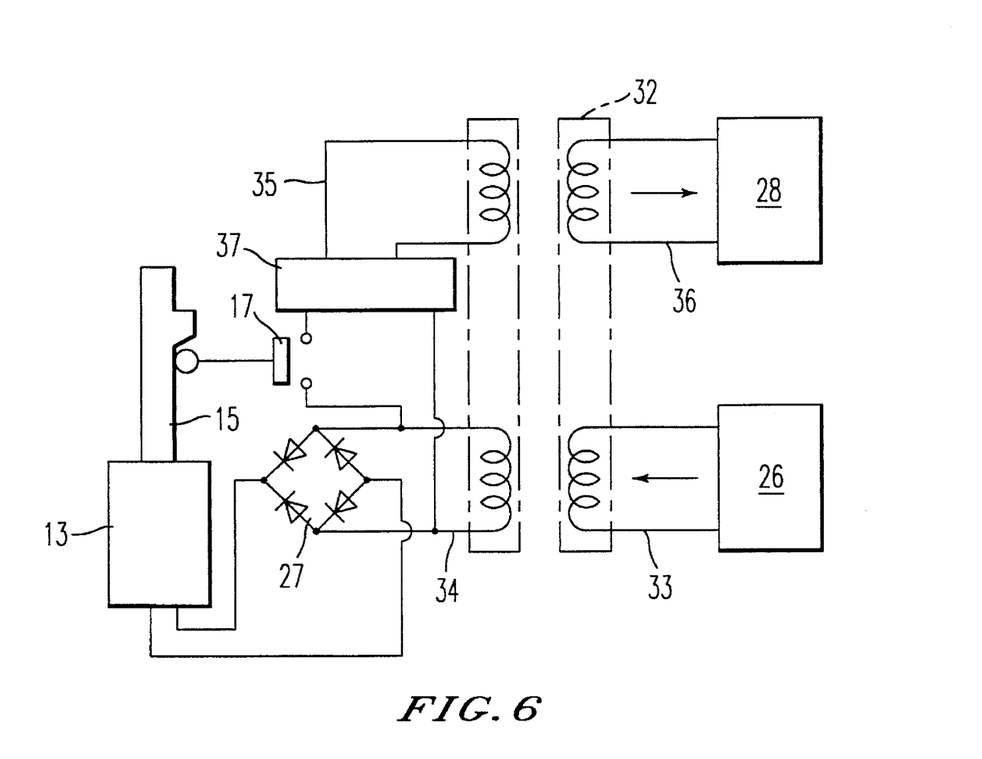
FIG. 6 shows a second embodiment of an electrical operating and monitoring arrangement for the electromechanical actuator of the control device.

FIG. 6 shows a second example of an electrical device for operating and monitoring an electromechanical actuator of a control device in accordance with the invention.

The actuator 13 is operated by way of a rotary transformer 32 comprising two independent sets of windings, each set comprising a primary winding and a secondary winding. The primary winding 33 and secondary winding 34 serve to transmit the electric power output of a supply device 26. This operates the actuator 13 and powers, by way of a position detector switch 17 such as an end of stroke detector, an oscillator 37 of high frequency f and low power relative to the frequency and power level of the power supply. The oscillator output signal is voltage-controlled by an internal voltage controller (not shown). The primary winding 35 and secondary winding 36 have only a few turns and serve to transmit to a position monitor 28 the signal delivered by the oscillator 37, the frequency f thereof representing the position of the actuator 13.

This second embodiment of an electrical device for operating and monitoring the electromechanical actuator is compact and light since it has only a single rotary transformer, which simultaneously transmits, by way of independent sets of windings, electrical power from a fixed system to a rotating system and an electrical signal representing actuator position. However, the presence of the oscillator limits its use to environments in which the temperature variations lie within the operating range of the oscillator.

The actuator is operated as follows.

During the period the blades are locked the rod 15 of the actuator 13 is in a limit position, and the switch which serves as position detector is open and no signal is transmitted to the monitor 28. In response to an instruction to unlock the blades, the actuator 13 is electrically energized sufficiently to move the rod 15. A magnetic flux is produced in the winding of the actuator 13 and the rod 15 is moved by magnetic forces towards an unlocked position. During this movement the rod 15 operates the position detector 17 and closes its switch. An electrical signal is therefore transmitted to the position monitor 28.

Figure 7:
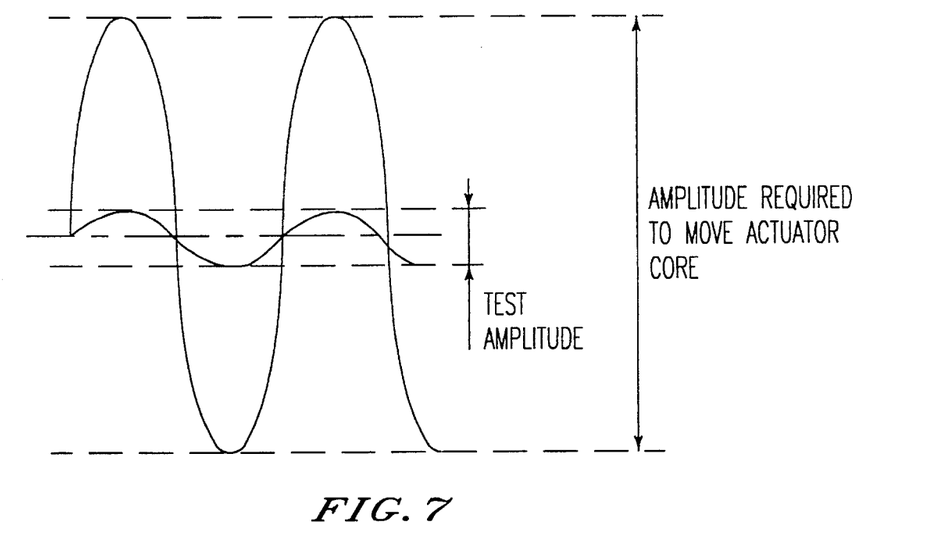
FIG. 7 is a diagram comparing the amplitudes of the currents drawn by the electromechanical actuator during locked and unlocked periods.

FIG. 7 shows a comparative example of the amplitude of the currents drawn by the actuator 13 during locked and unlocked periods. During the unlocked period, when the rod 15 is of course in the unlocked position, the position of the actuator rod 15 is monitored by the transmission of an electrical signal to a position monitor 28. Absence of the latter signal indicates a malfunctioning of the actuator 13. During the locked period the position of the rod 15 is monitored by supplying the actuator 13 with an electrical signal of an amplitude smaller than is needed to move the rod 15. The absence of the signal from the position monitor 28 then indicates correct operation of the actuator.

The actuators 12 of the movable stops 20 are operated in the same way as the blade-locking actuator 13. The previous description referring to FIGS. 5, 6 and 7 therefore also applies to operation of the actuators 12.

Figure 8A:
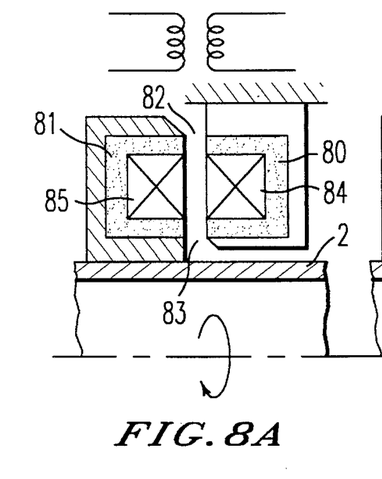
FIG. 8a illustrates one example of a rotary transformer which may be used in the control device of the invention.
Figures 8B, 8C:
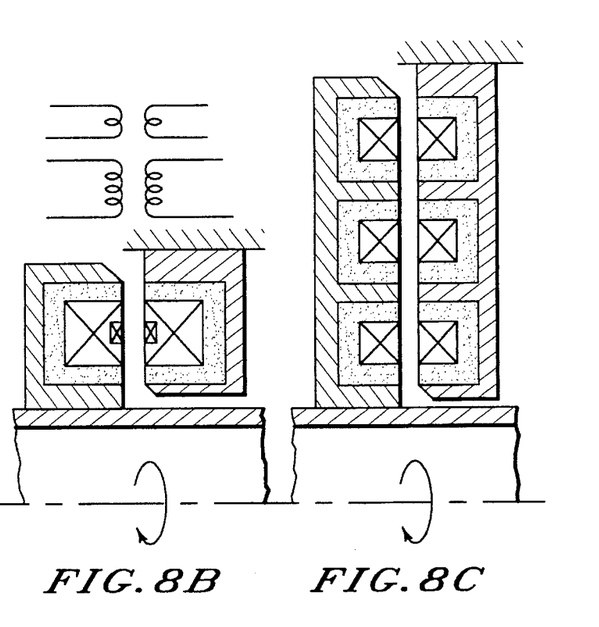
FIG. 8b illustrates a second example of a rotary transformer which may be used in the control device of the invention.
FIG. 8c illustrates a third example of a rotary transformer which may be used in the control device of the invention.

FIGS. 8a, 8b and 8c show three examples of rotary transformers which may be used in the control device of the invention.

The rotary transformers comprise a fixed magnetic circuit 80 rigidly secured to the fixed structure of the turbojet engine and separated by axial air gaps 82, 83 from a rotary magnetic circuit 81 secured to the engine shaft 2.

In the configuration shown in FIG. 8a the rotary transformer comprises a set of windings consisting of a stationary primary winding 84 and a rotary secondary winding 85. This enables electrical power to be transmitted without mechanical contact from a stationary system to a rotating system.

In the configuration of FIG. 8b the rotary transformer comprises a first set of windings for the contactless transmission of electrical power from a stationary system to a rotating system, and a second set of windings which have just a few turns, for example one or two turns, which is independent of the first set of windings and which serve to transmit an electrical signal.

In the configuration of FIG. 8c three rotary transformers are shown. These are arranged one above another to form three independent sets of windings, the sets being magnetically insulated from one another. They can transmit three electrical signals independently of one another.

Other configurations are possible. In particular, two rotary transformers are necessary to power, on the one hand, the actuator 12 of the movable stops corresponding to a given intermediate position of the fan blades and, on the other hand, the actuator 13 of the blade-locking system. Each of these transformers comprises a set of windings for transmitting the power for operating the particular actuator concerned and a set of windings to transmit an electrical signal for monitoring the position of the rod of the particular actuator concerned.

If a number of intermediate positions of the fan blades are available, rotary transformers must be provided corresponding to the number of actuators of the respective movable stops.

The pitch variation control device for the blades of a fan operates as follows.

When the blades are in the predetermined position for forward thrust or reverse thrust and are set against a fixed or movable stop, the speed reducer 3 drives the engine shaft 2 and the shaft 2 drives the bolt actuator 13 and the blades 1. The blades are kept stationary around their longitudinal axis by means of the bolt 14 positioned by the actuator 13. The blades 1 drive the toothed wheel 8 and the rotor 7 of the electric motor. There is no electrical energization of the stator winding of the electric motor.

To alter the operating conditions of the turbojet engine the position of the blades is altered to set them against another fixed or movable stop. It is particularly useful to have three blade positions available, two for two different forward thrust modes of operation and the third for reverse thrust operation.

The two forward thrust modes may, for example, correspond to a take-off phase and a cruising phase, for which the blades are set against a first fixed end stop and against an intermediate movable stop respectively. In the reverse thrust mode the blades are set against a second fixed end stop.

Figure 9:
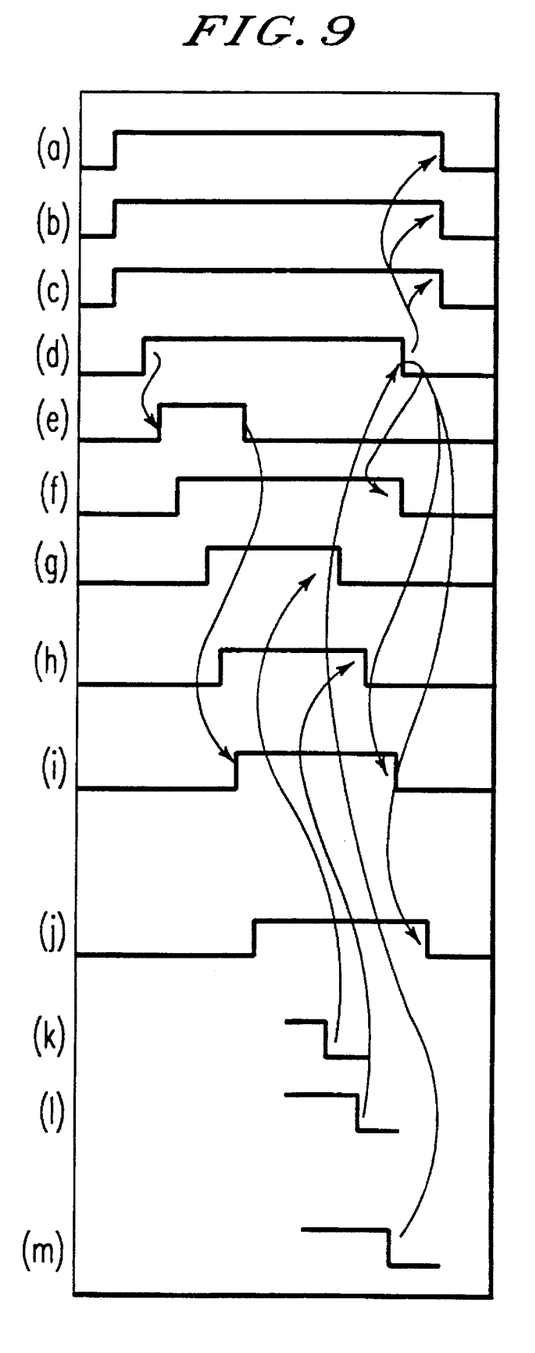
FIG. 9 shows an example of an operating diagram of the control device during changeover of the blade pitch from forward thrust to reverse thrust positions; and, FIG. 10 shows an example of an operating diagram of the control device during changeover of the blade pitch from a take-off position to a cruising position.

The blade positions are altered on changeover from a forward thrust phase to a reverse thrust phase in accordance with the timing diagram shown in FIG. 9. The changeover from a forward thrust phase to a reverse thrust phase thus involves:

(a) measuring the speed of rotation of the engine shaft 2, and (b) checking the position of the movable stop and (c) checking the position of the bolt;

(d) powering the electric motor;

(e) producing between the stator and the rotor a magnetic field rotating at a different speed from the engine shaft so as to produce a magnetic torque capable of holding the blades against the fixed stops associated with forward thrust to facilitate unlocking and to retain the blades in a forward thrust position during the unlocking operation;

(f) measuring the magnetic torque in order to check that the electric motor is operating properly;

(g) energizing the actuator 12 of the movable stop 20 so that this stop retracts;

(h) energizing the bolt actuator 13 so that the rod 15 thereof retracts and the bolt 14 releases the blade roots 4;

(i) altering the speed of the rotating magnetic field so that the direction of the magnetic torque is reversed and the blades are rotated around their longitudinal axis, by virtue of the engagement between the toothed wheel 8 with the pinion sectors 9, from the forward thrust position as far as the fixed stops determining the reverse thrust position;

(j) checking the position of the blades;

(k) cutting off the power to the movable stops so as to prevent accidental return of the blades to the forward thrust position in the event of a malfunctioning of the locking device;

(l) cutting off the power supply to the locking system to lock the blade roots in the reverse thrust position; and (m) cutting off the power supply to the electric motor.

Figure 10:
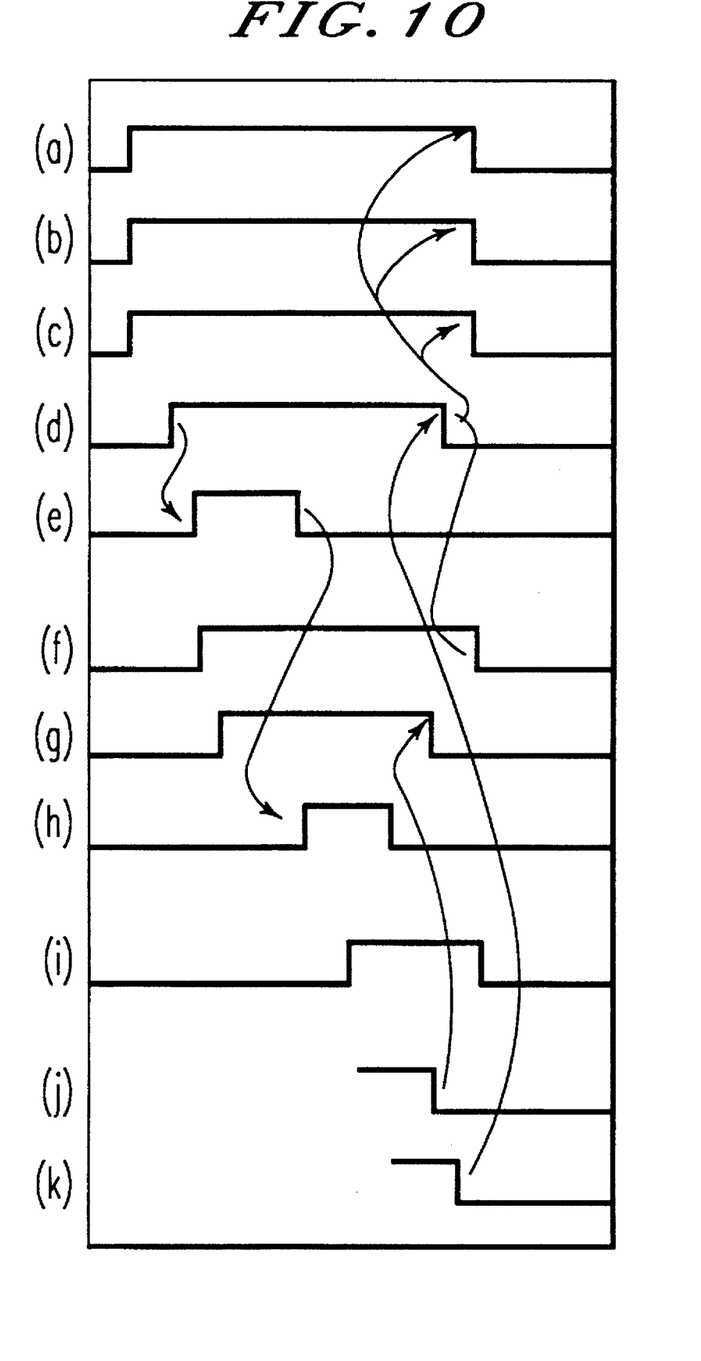

The timing diagram relating to the alteration in blade position for the changeover from a take-off phase to a cruising phase is shown in FIG. 10. It is similar to the diagram of FIG. 9 but is devoid of stages (g) and (k) of the method which respectively involve energizing and de-energizing the actuator 12 of the movable stop 20, since the latter must remain in position as it is the stop against which the blades have to be set.

The method is similar for a return to a forward thrust position. The only modification concerns the speed of the rotating magnetic field and the direction of the magnetic torque produced thereby so that before the bolt is powered the blade roots are kept held against the stops corresponding to the reverse thrust position, and after the bolt is powered the blades are rotated from the reverse thrust position as far as the fixed stops corresponding to forward thrust.

Basically, the electric motor needs to be powered for only a few seconds corresponding to the time taken to alter the position of the blades. Advantageously, however, an extra safety feature is provided for forcing the blades against a mechanical stop in the event of simultaneous failures of the locking system. This safety feature is provided by triggering the power supply to the electric motor when a problem of simultaneous failures is detected so as to produce a rotating magnetic field permanently forcing the blades against a mechanical stop.

The locking system therefore has three safety levels, namely a bolt for locking the blades against rotation around their longitudinal axis, a movable stop preventing the blades from changing over from a forward thrust position to a reverse thrust position, and a rotating magnetic field for locking the blades in case of simultaneous failures of the bolt and movable stop.

This invention is not limited to the embodiment hereinbefore described. In particular the number of intermediate blade positions is not limited, and a number of movable stops each allocated to a different blade position can be provided. Also, the locking system can be arranged to hold one or more blade roots depending on the reliability requirements.

I claim:

1. A pitch variation control device for blades of a turbomachine having a rotor wherein said blades are mounted on a disc rotated by a shaft of the turbomachine and each of said blades has a longitudinal axis and a root by which said blade is pivotable about its longitudinal axis, said control device comprising:

actuating means for changing the pitch of said blades and locking means for locking said roots of said blades, said actuating means including an electric motor having a stationary stator winding and a rotor which is secured to said turbomachine shaft and has no electrical connection to the stator, a toothed wheel which is rigidly secured to said rotor of said electric motor, and pinion sectors rigidly secured to said roots of said blades and meshing with said toothed wheel, said locking means including an electromechanical actuator which is rigidly secured to said turbomachine shaft, and a rotary transformer electrically powering said actuator.

2. A device according to claim 1, which comprises fixed stops respectively corresponding to two extreme blade positions, said fixed stops defining maximum angular movement of an assembly formed by said pinion sectors, said toothed wheel and said rotor of said electric motor.

3. A device according to claim 2, which comprises at least one movable stop corresponding to at least one intermediate blade position between said two extreme positions.

4. A device according to claim 3, wherein said movable stop comprises an electromagnet powered by a rotary transformer.

5. A device according to claim 4, wherein said electromagnet comprises a winding in a casing rigidly secured to said turbomachine shaft and a first metal rod which is movable longitudinally in said winding.

6. A device according to claim 5, which comprises a return spring mounted around said rod.

7. A device according to claim 5, wherein said electromechanical actuator actuates a bolt retaining said blade roots in a predetermined position and includes a winding which is housed in a casing rigidly secured to said turbomachine shaft and within which a second metal rod is disposed for longitudinal movement, said second metal rod being rigidly secured to said bolt.

8. A device according to claim 7, which comprises a mechanism monitoring the position of the first rod of said electromagnet forming said movable stop and a mechanism monitoring the position of the rod of the bolt actuator, the position-monitoring mechanism for said first and second rod comprising a position detector and a position monitor electrically energized by at least one rotary transformer.

9. A device according to claim 8, wherein said position detector comprises an end of stroke contact.

10. A device according to claim 9, wherein said position monitor is electrically powered by first and second rotary transformers, wherein the first rotary transformer comprises a fixed primary winding connected to an electrical power supply and a secondary winding secured to said turbomachine shaft and the second rotary transformer comprises a primary winding secured to said turbomachine shaft and connected by said position detector to said secondary winding of said first rotary transformer and a secondary winding connected to said position monitor.

11. A device according to claim 9, wherein said position monitor is electrically powered by a single rotary transformer having first and second independent sets of windings, the first set of windings including a primary winding connected to an electrical power supply and a secondary winding connected to an oscillator by said position detector, and the second set of windings having a plurality of turns and includes a primary winding connected to the oscillator and a secondary winding connected to said position monitor.

12. A method of operating a pitch variation control device for blades of a turbomachine having a rotor wherein said blades are mounted on a disc rotated by a shaft of the turbomachine and each of said blades has a longitudinal axis and a root by which said blade is pivotable about its longitudinal axis, said control device including actuating means for changing the pitch of the blades and locking means for locking said roots of the blades, the actuating means including an electric motor having a stationary stator winding and a rotor which is secured to said turbomachine shaft and which has no electrical connection to the stator, a toothed wheel which is rigidly secured to the rotor of the electric motor, and pinion sectors rigidly secured to the roots of the blades and meshing with the toothed wheel, the locking means including an electromechanical actuator which is rigidly secured to the turbomachine shaft and a rotary transformer electrically powering the actuator; the control device also including first stops respectively corresponding to two extreme blade positions, the first stops defining maximum angular movement of an assembly formed by said pinion sectors, said toothed wheel and said rotor of said electric motor; a movable stop corresponding to at least one intermediate blade position between the two extreme positions, the movable stop comprising an electromagnet powered by a rotary transformer, wherein said electromagnet comprises a winding in a casing rigidly secured to the turbomachine shaft and a metal rod which is movable longitudinally in said winding, said electromechanical actuator actuates a bolt retaining the blade roots in a predetermined position and including a winding which is housed in a casing rigidly secured to the turbomachine shaft and within which a metal rod is disposed for a longitudinal movement, the metal rod of said electromechanical actuator being rigidly secured to the bolt; means for monitoring the position of the rod of the electromagnet forming the movable stop and means for monitoring the position of the rod of the electromechanical actuator, the position-monitoring means for each of said rods comprising a position detector associated with a position monitor electrically energized by at least one rotary transformer when the rod is in a retracted position, the pitch variation control device changing over from a locked position against one of said first stops to a locked position against a second stop of said first stops, comprising the steps of:

measuring the speed of rotation of said turbomachine shaft and monitoring the position of said bolt;

powering said electric motor;

producing a rotating magnetic field between the stator and the rotor of said electric motor such that the magnetic field rotates at a different speed from said turbomachine shaft to produce a magnetic torque to clamp said blades in position against one of said first stops to facilitate unlocking of said blade roots and to retain said blades in said position during the unlocking operation;

supplying power to said electromechanical actuator to release said blade roots;

altering the speed of said rotating magnetic field so that the direction of the magnetic torque is reversed and said blades are rotated around their longitudinal axes from said one of said first stops as far as said second stop;

cutting off the power supply to lock said blade roots against said second stop; and cutting off the power supply to said electric motor.

13. A method according to claim 12, wherein upon changing from a locked position against said one of said first stops to a locked position against the second stop, a position of said movable stop is monitored before powering said electric motor, the electromagnet of said movable stop is powered before powering said electromechanical actuator of said bolt, and the power supply to said electromagnet of said movable stop is cut off after rotation of said blades into position against said second stop so as to prevent accidental return of said blades to an initial position.

14. A method according to claim 13, which comprises, in the event of simultaneous malfunctioning of said bolt and of said movable stop, supplying power to said electric motor to produce a rotating magnetic field.

15. A pitch variation control device for blades of a turbomachine having a rotor wherein said blades are mounted on a disc rotated by a shaft of the turbomachine and each of said blades has a longitudinal axis and a root by which said blades are each pivotable about the longitudinal axes thereof, said control device comprising:

an actuator changing the pitch of said blades and a lock locking said roots of the blade, said actuator including an electric motor having a stationary stator winding and a rotor which is secured to said turbomachine shaft and has no electrical connection to the stator;

a toothed wheel which is rigidly secured to said rotor of said electric motor, and pinion sectors rigidly secured to said roots of said blades and meshing with said toothed wheel, said lock including an electromechanical actuator which is rigidly secured to said turbomachine shaft, and a rotary transformer electrically powering said actuator.

16. A device according to claim 15, which comprises fixed stops respectively corresponding to two extreme blade positions, said fixed stops defining maximum angular movement of an assembly formed by said pinion sectors, said toothed wheel and said rotor of said electric motor.

17. A device according to claim 16, which comprises at least one movable stop corresponding to at least one intermediate blade position between said two extreme blade positions.

18. A device according to claim 17, wherein said movable stop comprises an electromagnet powered by a rotary transformer.

19. A device according to claim 18, wherein said electromagnet comprises a winding in a casing rigidly secured to said turbomachine shaft and a first metal rod which is movable longitudinally in said winding.

20. A device according to claim 19, which comprises a return spring mounted around said rod.

21. A device according to claim 19, wherein said electromechanical actuator actuates a bolt retaining said blade roots in a predetermined position and includes a winding which is housed in a casing rigidly secured to said turbomachine shaft and within which a second metal rod is disposed for longitudinal movement, said second metal rod being rigidly secured to said bolt.

22. A device according to claim 21, which comprises a monitor monitoring the position of the first rod of said electromagnet forming said movable stop and a monitor monitoring the position of the rod of the actuator which actuates the bolt, the position-monitoring monitor for each of said first rod and said rod of the actuator comprising a position detector associated with a position monitor electrically energized by at least one rotary transformer when said first rod and said rod of the actuator are respectively in a retracted position.

23. A device according to claim 22, wherein said position detector comprises an end of stroke contact.

24. A device according to claim 23, wherein said position monitor is electrically powered by first and second rotary transformers wherein the first rotary transformer comprises a fixed primary winding connected to an electrical power supply and a secondary winding secured to said turbomachine shaft and the second rotary transformer comprises a primary winding secured to said turbomachine shaft and connected by said position detector to said secondary winding of said first rotary transformer and a secondary winding connected to said position monitor.

25. A device according to claim 22, wherein said position monitor is electrically powered by a single transformer having first and second independent sets of windings, the first set of windings including a primary winding connected to an electrical power supply and a secondary winding connected to an oscillator by said position detector, and the second set of windings have a plurality of turns and include a primary winding connected to the oscillator and a secondary winding connected to said position monitor.

26. A method of operating a pitch variation control device for blades of a turbomachine having a rotor wherein said blades are mounted on a disc rotated by a shaft of the turbomachine and each of said blades has a longitudinal axis and a root by which said blade is pivotable about its longitudinal axis, said control device including an actuator changing the pitch of the blades and a lock locking said roots of the blades, the actuator including an electric motor having a stationary stator winding and a rotor which is secured to said turbomachine shaft and has no electrical connection to the stator, a toothed wheel which is rigidly secured to the rotor of the electric motor, and pinion sectors rigidly secured to the roots of the blades and meshing with the toothed wheel, the lock including an electromechanical actuator which is rigidly secured to the turbomachine shaft and a transformer electrically powering the actuator and a first metal rod; the control device also including fixed stops respectively corresponding to two extreme blade positions, the fixed stops defining maximum angular movement of an assembly formed by said pinion sectors, said toothed wheel and said rotor of said electric motor; a movable stop corresponding to at least one intermediate blade positioned between the two extreme blade positions, the movable stop comprising an electromagnet powered by a rotary transformer, wherein said electromagnet comprises a winding in a casing rigidly secured to the turbomachine shaft and a second metal rod which is movable longitudinally in said winding and wherein said electromechanical actuator actuates a bolt retaining the blade roots in a predetermined position and includes a winding which is housed in a casing rigidly secured to the turbomachine shaft and within which the first metal rod is disposed for longitudinal movement, the first metal rod being rigidly secured to the bolt; a monitor monitoring the position of the second rod of the electromagnet forming the movable stop and a monitor monitoring the position of the second rod of the electromagnet, the position monitor for the first rod comprisintg a position detector associated with a position monitor electrically energized by at least one rotary transformer when the first rodis in a retracted position,the pitch variation control device changing over from a locked position against one of the fixed stops to a locked position against a second stop of the fixed stops, the method comprising the steps of:

measuring the speed of rotation of said turbomachine shaft and monitoring the position of said bolt;

powering said electric motor;

producing a rotating magnetic field between the stator and the rotor of said electric motor such that the magnetic field rotates at a different speed from said turbomachine shaft to produce a magnetic torque to clamp said blades in position against said one of said first stops to facilitate unlocking of said blade roots and to retain said blades in said position during the unlocking operation;

supplying power to said electromechanical actuator to release said blade roots;

altering the speed of said rotating magnetic field so that the direction of rotation of the magnetic torque is reversed and said blades are rotated around their longitudinal axes as far as said second stop;

cutting off the power supply so as to lock said blade roots against said second stop; and cutting off the power supply to said electric motor.

27. A method according to claim 26, wherein upon changing from a first locked position to a second locked position, a position of said movable stop is monitored before powering said electric motor, the actuator of said movable stop is powered before powering said electromechanical actuator, and the power supply to said movable stop actuator is cut off after rotation of said blades into position against said second stop so as to prevent accidental return of said blades to an initial position in the event of a malfunction of blade root locking.

28. A method according to claim 27, which comprises, in the event of simultaneous malfunctioning of said bolt and of said movable stop, supplying power to said electric motor to produce a rotating magnetic field.

* * * * *

UNITED STATES PATENT AND TRADEMARK OFFICE
CERTIFICATE OF CORRECTION

PATENT NO. : 5,595,474
DATED : JANUARY 21, 1997
INVENTOR(S) : GIRARD

It is certified that error appears in the above-identified patent and that said Letters Patent is hereby corrected as shown below:

Column 5, line 51, after "locked" insert --and--.

Column 12, line 17, change "comprisintg" to --comprising--.

Column 12, line 19, change "rodis" to --rod is--.

Signed and Sealed this

Fifth Day of May, 1998

Attest:

BRUCE LEHMAN

Attesting Officer

Commissioner of Patents and Trademarks